US009592678B2

(12) United States Patent
Phillips et al.

(10) Patent No.: US 9,592,678 B2
(45) Date of Patent: Mar. 14, 2017

(54) METHOD AND SYSTEM FOR OPTIMIZING LASER MARKING ON A FOOD PRODUCT

(71) Applicant: TEN Media, LLC, San Juan Capistrano, CA (US)

(72) Inventors: Jonathan R. Phillips, San Juan Capistrano, CA (US); Richard C. Blackburn, Santa Ana, CA (US)

(73) Assignee: YTA Holdings LLC, Los Angeles, CA (US)

( * ) Notice: Subject to any disclaimer, the term of this patent is extended or adjusted under 35 U.S.C. 154(b) by 0 days.

(21) Appl. No.: 15/005,984

(22) Filed: Jan. 25, 2016

(65) Prior Publication Data

US 2016/0221356 A1 Aug. 4, 2016

Related U.S. Application Data

(60) Provisional application No. 62/107,385, filed on Jan. 24, 2015, provisional application No. 62/107,386, (Continued)

(51) Int. Cl.
*B41J 2/435* (2006.01)
*B41J 2/455* (2006.01)
(Continued)

(52) U.S. Cl.
CPC ............. *B41J 2/455* (2013.01); *A23L 5/32* (2016.08); *A23L 15/00* (2016.08); *B23K 26/0006* (2013.01); *B23K 26/0066* (2013.01); *B23K 26/0622* (2015.10); *A23V 2002/00* (2013.01); *B41M 5/24* (2013.01)

(58) Field of Classification Search
CPC ...... B41J 2/435; B41J 2/442; B41J 2/47; B41J 2/455; B41J 3/4073; B23K 26/0006; B23K 26/0622; B23K 26/0066; A23L 1/32; A23L 1/0252; A23V 2002/00
See application file for complete search history.

(56) References Cited

U.S. PATENT DOCUMENTS 7,015,418 B2 3/2006 Cahill
2003/0206227 A1 11/2003 Assa
(Continued)

OTHER PUBLICATIONS

International Search Report from corresponding PCT Application No. PCT/US2016/014775 mailed Mar. 24, 2016 (2 pgs.).
(Continued)

*Primary Examiner* — Kristal Feggins
(74) *Attorney, Agent, or Firm* — Hankin Patent Law, APC; Susan L. Mizer; Anooj M. Patel (57) ABSTRACT

The present disclosure includes a method and system for applying markings on a food product by applying a radiant energy to the food product in such a manner to form a permanent marking thereon. The markings include text and graphics, and can include an advertisement, a freshness date, a traceability code, or other types of relevant information. A laser is preferably employed as the radiant energy source. The method preferably forms the markings on the food product while the product moves through a predetermined region of a food processing system. The performance or characteristics of the laser may be adjusted in response to selected characteristics of the food product, environmental conditions, and processing conditions, in order to optimize the marking applied thereon.

20 Claims, 9 Drawing Sheets

Related U.S. Application Data filed on Jan. 24, 2015, provisional application No. 62/107,408, filed on Jan. 24, 2015.

(51) Int. Cl.
 *B23K 26/00* (2014.01)
 *B41M 5/24* (2006.01)

(56) References Cited

U.S. PATENT DOCUMENTS

2011/0013177 A1 1/2011 Crim
2012/0114820 A1 5/2012 Griffiths

OTHER PUBLICATIONS

Written Opinion of the International Searching Authority from corresponding Application No. PCT/US2016/014775 mailed Mar. 24, 2016 (7 pgs.).

METHOD AND SYSTEM FOR OPTIMIZING LASER MARKING ON A FOOD PRODUCT

CROSS-REFERENCE TO RELATED APPLICATIONS

This application claims the benefit of U.S. Provisional Application No. 62/107,385 filed on Jan. 24, 2015, U.S. Provisional Application No. 62/107,386 filed on Jan. 24, 2015, and U.S. Provisional Application No. 62/107,408 filed on Jan. 24, 2015, the contents of which are incorporated herein by reference in their entirety.

BACKGROUND

The disclosure relates generally to the field of food product processing, and more particularly methods and systems for optimizing laser markings on food products. While reference is made herein to eggs in particular, it should be understood that this disclosure is directed to all food products in which a laser mark may be applied thereon.

In the egg packing industry, eggs typically undergo a great deal of processing before they are ready to be sold to the consuming public. In many circumstances, for example, eggs pass through several processing stations where they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc. (U.S. Pat. Nos. 4,189,898; 4,195,736; 4,505,373; 4,519,494; 4,519,505; 4,569,444; 4,750,316; 5,321,491; and 6,056,341) and TEN Media LLC (U.S. Pat. No. 8,455,030), which are incorporated herein by reference in their entirety. As a reference, it is not uncommon for a facility in which these stations operate to output about one million eggs in a single day. Accordingly, to be commercially acceptable, the throughput of the stations needs to be quite high, with some stations typically processing on the order of 20,000 eggs per hour.

The egg packing industry uses devices known as "packers" to pack the eggs into the packages. Typically, a packer includes a conveyor (e.g., a belt conveyor, roller conveyor, chain conveyor, etc.) that moves empty packages through an egg loading section (where the eggs are loaded into the egg loading section from above) and then moves the filled packages to a package closing section that is responsible for closing the lids of the packages. The eggs may be supplied to the egg packer via a grader system.

An egg packing process that uses "packers," typically uses bulk belts to bring eggs from a bulk supply location. The eggs are cleaned or disinfected, in some instances using UV light while clamped to transport chains, and in some instances through immersion in sanitizing wash water. The eggs are then inspected either electronically or manually, they are weighed to establish size, inspected for cracks using ultrasonic inspection and loaded into a chain driven carriage mechanism ("Transfer Loader"). The egg is then normally transported to one of a plurality of packing machines by the aforementioned carriage mechanism. The particular packing machine to which any individual egg may be transported is determined by a computer. This process or elements thereof up to, but not including the packing machine, constitute grading ("Grading" and the "Grader"). The carriage mechanism typically consists of one or a plurality of chains, running the length of the Grader past all the packing machines in the horizontal plane ("Grader Chains"). The packing machines are usually configured with an egg flow perpendicular to the Grader Chain in the horizontal plane.

The egg industry widely uses Continuous Inkjet Printer technology ("CIJ Printers") to print Size, Grade and Date information together with other information or images and logos ("Data") on to the surface of an egg shell of a fresh egg travelling through an egg grading machine. The CIJ Printers are traditionally placed in a location on the production line that is responsible for grading the eggs and the site for such installation is chosen to minimize the number of CIJ Printers required for a given installation. CIJ Printers have typically been installed on the Grader Chains as near to the Transfer Loader as practical, and typically (although not always), prior to all the packing machines to which almost all eggs are later diverted.

As a consequence of the location, the CIJ Printer provides a relatively economic means of applying Data that limits the number of printing heads. Like most processing methods the execution of these installs represents a compromise of many factors, and the method described above has disadvantages which adversely affect the equipment, retailers, and consumers of eggs negatively. The negative elements of the method described above include:

a) The CIJ Printer's print-head is installed inverted below the flow of eggs;

b) Egg debris or broken eggs can fall into the jetting mechanism of the inkjet printer causing downtime and impeding print quality;

c) The flow of ink is upward and therefore stray ink can fall backwards and result in downtime and maintenance issues;

d) The linear speed of the eggs as they pass the print-head is fast and therefore the amount of data is limited;

e) The linear speed of the eggs as they pass the print-head is fast and therefore the print quality achieved is typically poor quality;

f) The eggs usually travel in the Grader Chain clamped long ways and therefore the print applied to the eggshell is on the side of the egg in a print direction equal to the direction of egg travel (along the long axis of the egg) with such print being normally unreadable by a consumer without handling the eggs in the carton;
   a. Handling the eggs in a carton can lead to contamination of the egg; and
   b. Handling of the egg in the carton can lead to increased levels of breakage by consumers inspecting eggs in the retail store where they are sold;

g) A reasonable high proportion of eggs will have very poor or unreadable marks due to a combination of these factors; and h) If the grader has a minor malfunction, an egg can be inadvertently diverted (or fall) from the Grader at an unplanned Packing Machine (i.e. not the one the computer had intended) because the plurality of packing lanes often process multiple brands of eggs concurrently, a badly branded or sized egg appearing in the wrong carton can be a legal and public relations issue and can cause both consumer and retailer dissatisfaction.

As such, there is a need in the art for a system and method to improve the reliability and quality of applying markings to eggs as well as other food products.

BRIEF SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with embodiments herein, the present disclosure includes a method and system for applying markings on a food product by applying a radiant energy to the food product in such a manner to form a permanent marking thereon. The markings include text and graphics, and can include an advertisement, freshness information, traceability data, or other types of relevant information, or any combination thereof. A laser is preferably employed as the radiant energy source. Desirably, the radiant energy is applied so as to leave much of the area of the food product unaffected so as to form contrast between the unaffected areas and the marking. The method preferably forms the markings on the food product while the product moves through a predetermined region of a food processing system. The performance or characteristics of the laser may be adjusted in response to selected characteristics of the food product in order to optimize the marking applied thereon. Further, the interaction of the laser with the food product may be monitored by any suitable means and the depth or other characteristics of the laser marking may be adjusted in response to such parameters.

In a preferred embodiment, the present disclosure includes a method and system for applying markings on an egg by applying a radiant energy source to the shell of the egg so as to cause discoloration of the egg shell to form a permanent marking. In a preferred embodiment, the markings are made by laser etching without applying a foreign material to the egg shell.

In accordance with embodiments herein, the present disclosure includes an apparatus for applying markings on food products that is operable in association with a food packing system that packages the food products. The apparatus comprises a radiant energy source located in proximity to the food packing system so that the radiant energy source can apply radiant energy to the food product and form markings thereon.

A preferred embodiment includes an apparatus for applying markings on eggs that is operable in association with egg-handling machinery that performs washing, candling, grading, and packing of eggs. The apparatus comprises a radiant energy source located in proximity to the egg-handling machine, so that the radiant energy source can apply radiant energy to the egg and form the markings. In a preferred embodiment, the egg may be raw, pasteurized, or hardboiled and the egg has a marking applied thereon, wherein the marking is formed at least in part by discolored material on and native to the egg shell. The egg may include the marking being formed entirely by discolored material of the egg shell. The egg may also be raw or pasteurized. The radiant energy may be applied by a laser. The markings may be formed by a generally stationary radiant energy source as the egg is transported past the source, although the disclosure is inclusive of embodiments that allow the source to reciprocate and move concurrently with the egg transport mechanism.

In some embodiments, the present disclosure provides a method and system for applying markings on food products, comprising conveying the food product to a marking station having at least one laser marking device configured to apply laser energy of sufficient intensity to etch indicia on the food product, and activating the laser device to apply laser energy to the food product and etch the indicia thereon. The indicia includes text and graphics, and can include an advertisement or other graphical image, a freshness date, a traceability code, or other types of relevant information, or any combination thereof. In a preferred embodiment, the food product is an egg, and the laser etches the indicia on the outer surface of the shell of the egg. The applied laser energy may ablate and/or discolor the surface of the egg shell to an approximate depth that is within the range of about 5 to about 25 micrometers. The applied laser energy may ablate and/or discolor the surface of the egg shell to an approximate depth that is within the range of about 1.5 to about 8 percent of the thickness of the egg shell.

Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious aspects all without departing from the scope herein. Accordingly, the drawings and descriptions will be regarded as illustrative in nature and not as restrictive.

BRIEF DESCRIPTION OF THE DRAWINGS

The accompanying drawings incorporated herein and forming a part of the specification illustrate the example embodiments

DETAILED DESCRIPTION OF THE PREFERRED EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide methods and systems for optimizing laser markings on food products. Embodiments of the present disclosure are directed to an apparatus as well as a method for laser marking food products as they pass through a marking station, with the marking being carried out by lasers that are designed and configured to render text and graphic representations as the food products pass through the marking station. While reference is made herein to eggs in particular, it should be understood that this disclosure is directed to all food products in which a laser mark may be applied thereon. In the example embodiment, there is provided a method and system for applying markings on an egg by applying a radiant energy source to the shell of the egg so as to cause discoloration of the egg shell to form a permanent marking. However, it is to be appreciated that the embodiments of the claims herein are not limited in any way to the example embodiment, but rather are to be interpreted to cover applying markings to other suitable food products. That is, the embodiments herein can be applied to optimizing laser markings or indicia formed on any suitable food product.

It should be understood that the terms "marking" or "etching" or "printing" as used herein are intended to mean that a laser is employed as a radiant energy source. The laser beam is applied to leave most of the egg shell unaffected so as to provide contrast between the unaffected areas and the marking. The laser beam ablates and/or discolors the outer surface material from the egg shell. A significant benefit of the use of laser marking is that brown eggs have etched indicia that is a contrasting white color, while white eggs have etched indicia that is a contrasting dark brown color. The structural integrity of the egg shell is not affected because the etching by the beam only affects the outer approximately 5 to approximately 25 micrometers of the egg shell, which is approximately 5% to approximately 8% of the thickness of the egg shell.

Figure 1:
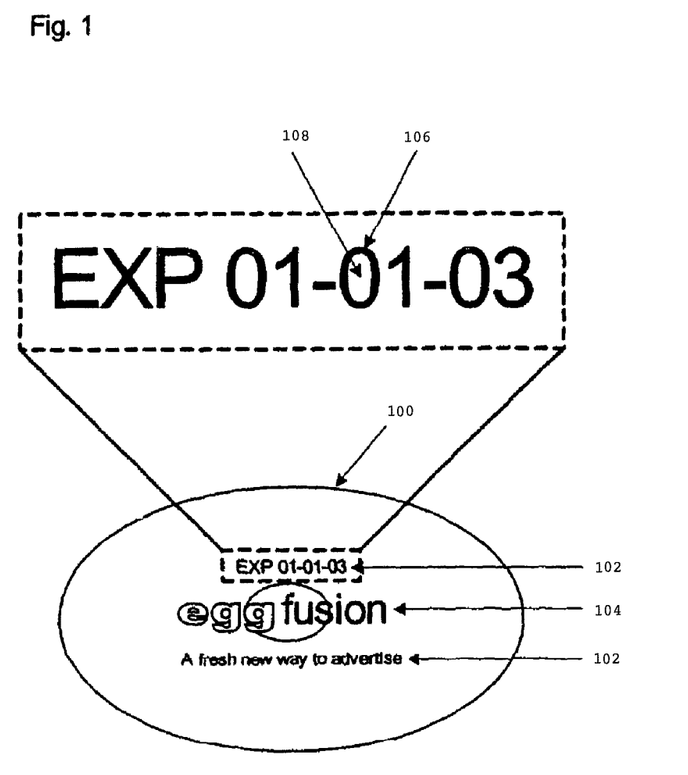
FIG. 1 is a diagram depicting an egg bearing markings using method and apparatus embodiments of the present disclosure.
Figure 2:
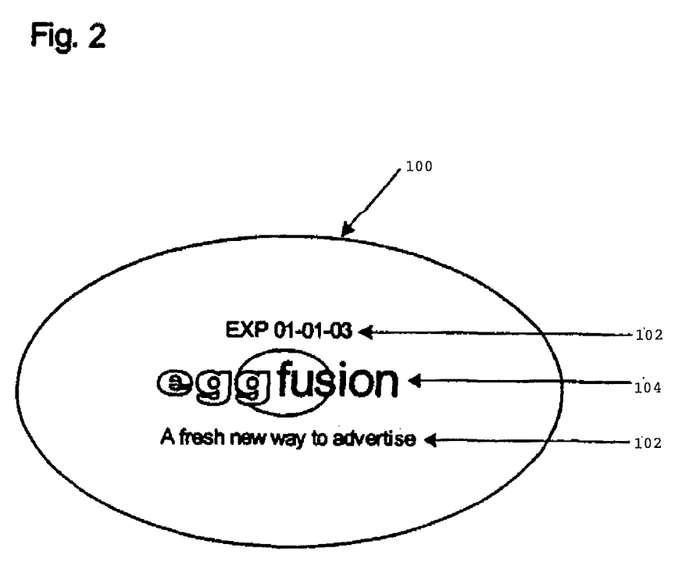
FIG. 2 is a diagram of another view of an egg bearing markings using method and apparatus embodiments of the present disclosure.
Figure 3:
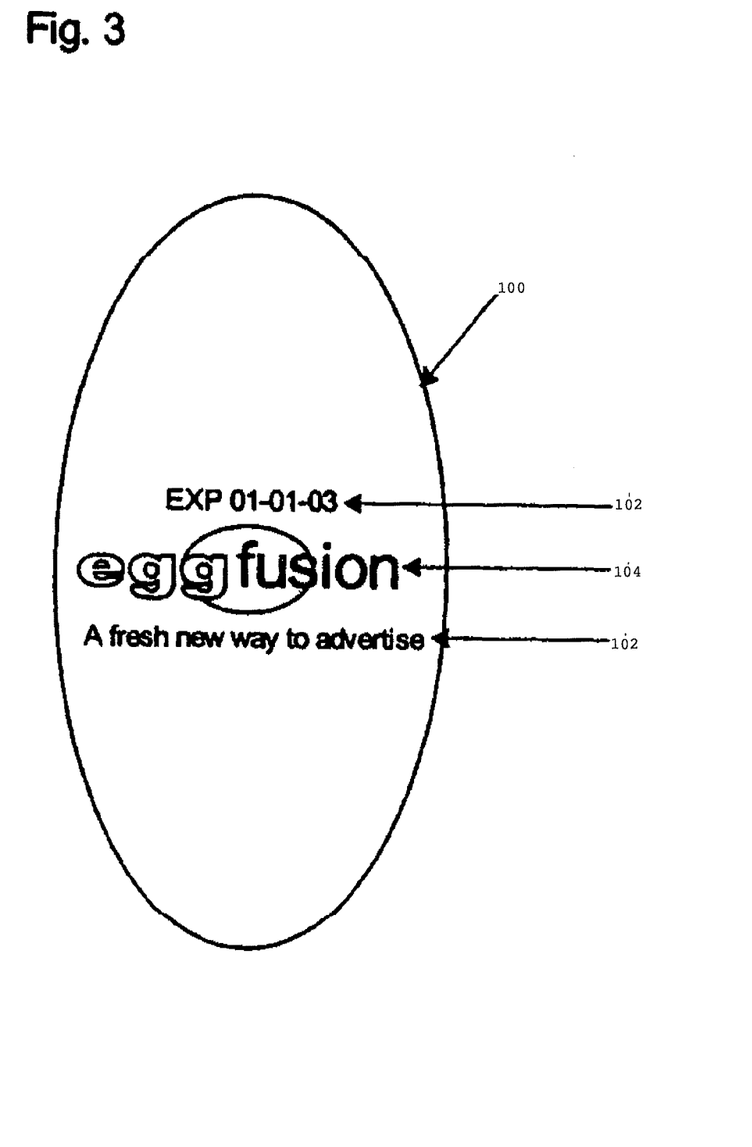
FIG. 3 is a diagram of another view of an egg bearing markings using method and apparatus embodiments of the present disclosure.
Figure 4:
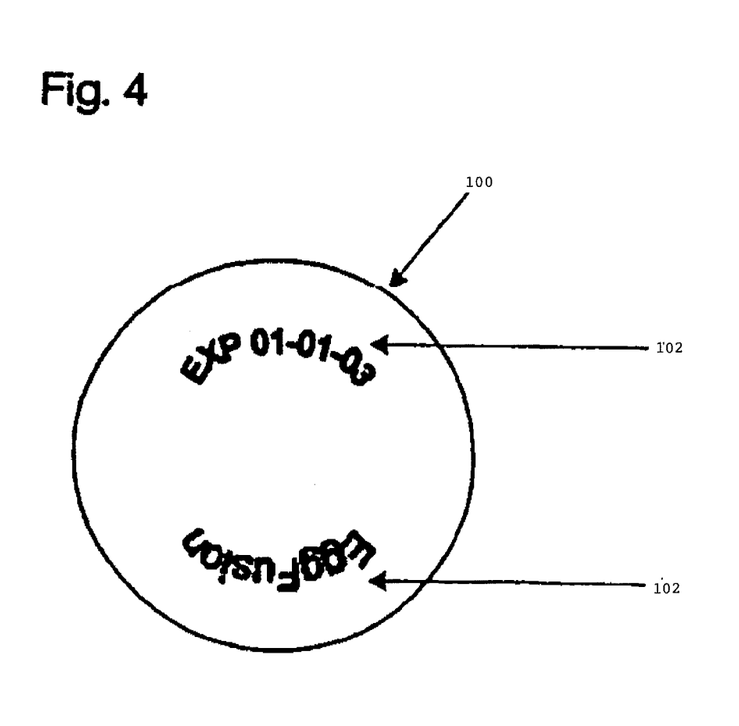
FIG. 4 is a diagram of a top view of an egg bearing markings using method and apparatus embodiments of the present disclosure.

Referring to FIG. 1, an egg 100 is provided with markings or indicia, the markings include text 102 and graphics 104, and can include an advertisement or other graphical image, a freshness date, a traceability code, or other types of relevant information, or any combination thereof. The markings are formed by discoloring material of the shell to form text 102 and graphics 104, such as that which forms the number 0 as indicated at 106, and leaving other areas of the shell unaffected, such as the area inside the number 0, as indicated at 108. The discoloration may also be done variably so as to form a gradient of discoloration to form the graphics 104, or to create a variety of text 102, such as bold text, italic text, or any type of text or font. That is, some areas may be more discolored than others as, for example, by exposing them to radiant energy for a higher intensity or longer duration, such as multiple passes, than other areas. The text and graphics may be applied horizontally (FIG. 2), vertically (FIG. 3), or on top (FIG. 4) of the egg.

Radiant energy as, for example, electromagnetic radiation such as visible, infrared, or ultraviolet light, can be used to discolor the egg shell. The radiant energy can be controlled to only discolor a targeted print area 106 of the egg shell. Some areas of the egg can be left unaffected 108 (see FIG. 1). The discoloration of the egg shell is easily viewable because of the contrast of the egg shell color 108 to the discoloration 106 from the radiant energy. A significant benefit of the use of laser marking is that brown eggs have etched indicia that is a contrasting white color, while white eggs have etched indicia that is a contrasting dark brown color. The discoloration can be used to form indicia or marking information on the eggs. The discoloration to form text and graphics can be applied generally simultaneously by one or more radiant energy sources.

No foreign material is required to be added to the egg shell in order for the radiant energy to discolor the egg shell. Thus, no foreign material, such as ink or radiant energy sensitive material that could react with the radiant energy needs to be added to form a marking. The radiant energy is applied to the natural eggshell. Thus, the marking most desirably is formed solely by the effect of the radiant energy on the normally occurring materials of the eggshell itself. This provides several significant benefits. The egg can be properly represented to the consumer as a product with no additives or contaminants. Moreover, because it is not necessary to apply additional materials for purposes of the marking process, it is unnecessary to add the equipment needed to coat the egg with a foreign substance. This greatly simplifies the task of performing the process inline in the production environment of an existing high-speed egg handling apparatus. Additionally the potentially significant cost of such additional materials is avoided.

In a method according to an embodiment of the present disclosure, a radiant energy source in proximity of an egg directs radiant energy towards the egg. Radiant energy source desirably includes a laser such as a $CO_2$ gas laser adapted to provide light at about 9.0 to about 10.6 micron wavelength, at a minimum of 25 watts, and a projected maximum of 200 watts radiated power, in a beam projected from approximately 100 mm at the surface of the egg. When operated in this power range, the beam ablates and/or discolors the outer surface material from the egg shell. The structural integrity of the egg shell is not affected because the etching by the beam only affects the outer approximately 5 to approximately 25 micrometers of the egg shell, which is approximately 1.5% to approximately 8% of the thickness of the egg shell. The beam is directed onto those areas of the egg, which are to be discolored and turned on and off so as to provide a series of pulses, the beam being "on" for about up to 60 milliseconds during each pulse. During this pulsed actuation, the beam is swept across those areas of the egg surface, which are to be discolored The sweeping motion may be performed in any manner which will provide the desired relative motion of the beam and the egg. Since the preferred embodiments will operate in association with an egg-handling machine which moves eggs at an extremely rapid speed, the beam must be rapidly moved to produce the desired indicia and also may compensate for the speed of movement of the eggs past the laser apparatus, which is preferably stationary. For example, the radiant energy source may include a beam-sweeping unit incorporating conventional optical elements such as movable or variable lenses, mirrors or prisms adapted to deflect the beam and to vary the deflection with time. Suitable radiant energy sources include, but are not limited to, Sealed CO2 Gas Lasers, Slow-flow CO2 Gas Lasers, TEA CO2 Mask Lasers, CO Gas Lasers, UV Gas Lasers, mid-IR Solid State Lasers, and solid state visible lasers. In other embodiments, the radiant energy source may be also be a YAG-type and/or fiber laser system, and may be coupled with a frequency multiplying optical element.

In a method according to an embodiment of the present disclosure, an egg moves through a portion of an egg-grading machine. An egg-grading machine grades the quality of the eggs, and may also transport the eggs towards a packaging machine. Egg-grading machines will move the egg along a path. Somewhere along the path, and preferably immediately before the eggs are packed, a predetermined region can be selected where the egg will pass through and radiant energy can form markings on the egg. Typically, egg-grading machines have calipers that hold the eggs at some point in the path of the egg-grading machine. The radiant energy source may be placed in proximity to this point when the eggs are held so that the radiant energy forms the markings on an egg as it passes through this predetermined region. This eliminates any need for a special apparatus to position the egg. In this way the method is performed inline with the egg-grading machine.

In another embodiment of the present disclosure, a radiant energy source may be placed in proximity of an existing egg-handling machine. Egg-handling machines includes any device or apparatus that will control the movement of an egg along a path, including egg-grading machines. The radiant energy source can be placed in proximity to the egg-handling machine so that the markings may be applied to the egg inline. The egg-handling machine moves an egg along a conveyor apparatus in a particular direction. A radiant energy source is placed in proximity to the conveyor apparatus such that radiant energy is directed towards egg.

Figure 5:
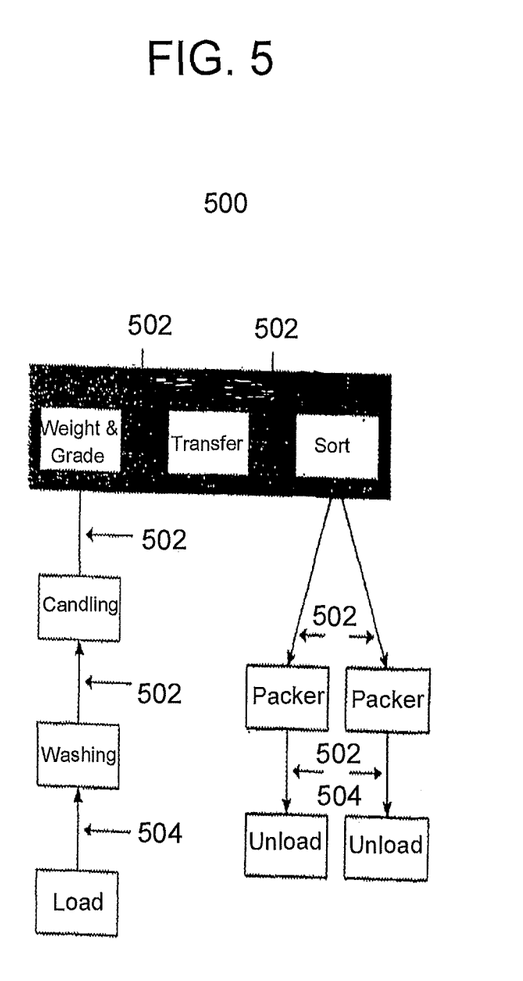
FIG. 5 is a block diagram depicting portions of an egg-handling machine and particularly illustrating inline and offline operations.

There are many variations of egg-handling machines. Most perform some common minimal basic functions. FIG. 5 is a block diagram outlining the basic functions of those machines. The eggs move through these machines 500 while these basic functions are performed, and a radiant energy source can be placed inline 502 or offline 504 in between many of these functions to perform a method of the present disclosure. The eggs are loaded into the machine. An offline procedure may be performed after this function. The eggs are then washed, after which an inline method may be performed. The eggs are candled, after which an inline method may be performed. The eggs move to the grading portion of the machine where they are weighted and graded, after which an inline method may be performed. The eggs are then transferred to a sorter, before which an inline method may be performed. The eggs are then sorted by grades and sizes, after which an inline method may be performed. The eggs are placed into a package, after which an inline method may be performed. An offline process 504 can be performed prior to the load processor and, typically involves human intervention or some other form of mechanical intervention alien to the egg-handling machine. In preferred embodiments of the present disclosure, the radiant energy source can be associated with an existing egg-handling machine without appreciably modifying the machine. The egg-handling machine preferably includes sensors or other suitable monitoring devices for monitoring the operational and environmental parameters of the egg-handling machine.

Figure 6:
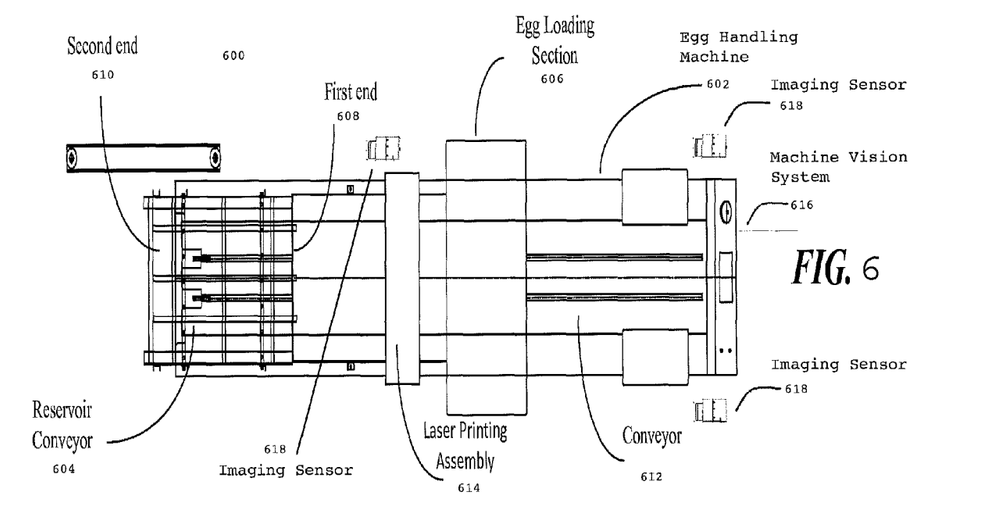
FIG. 6 is a diagrammatic view depicting apparatus for performing an embodiment of the method of the present disclosure.
Figure 7:
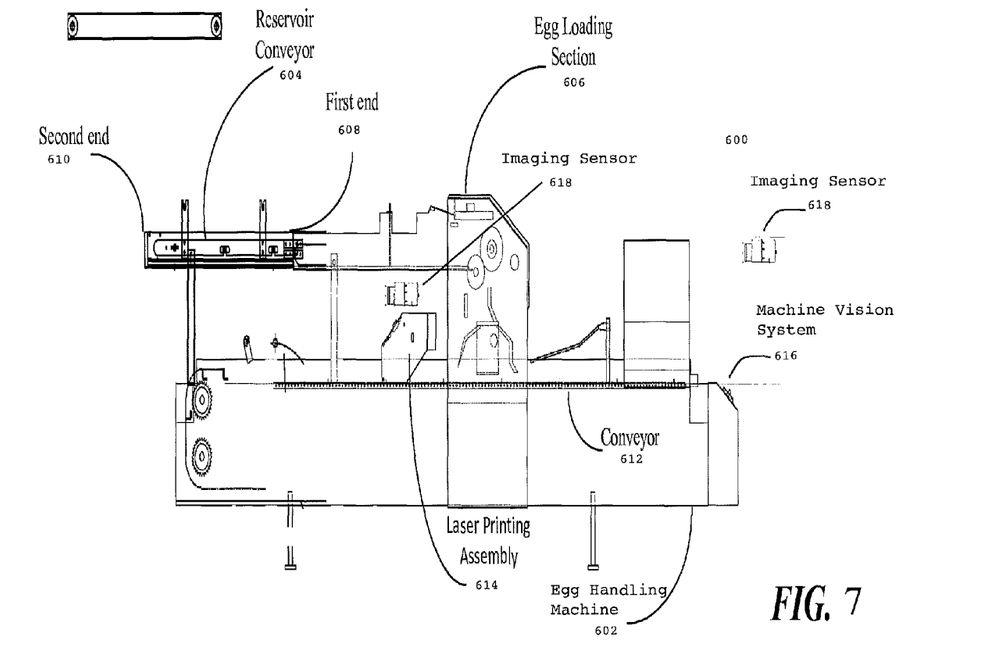
FIG. 7 is a diagrammatic view depicting apparatus for performing an embodiment of the method of the present disclosure.

FIG. 6 illustrates a top-view of a system diagram of an example embodiment of an apparatus 600 that is operable in association with an egg-handling machine 602 that performs washing, candling, grading, and packing of eggs as discussed above. The apparatus includes at least one laser printing assembly 614 comprised of at least one laser source operable to apply laser markings on eggs. FIG. 7 illustrates a side view of the system diagram of an example embodiment of apparatus 600 that is operable in association with egg-handling machine 602. While reference is made herein to eggs in particular, it should be understood that the same principles and features may be applied to an apparatus for applying marks on other suitable food products.

A reservoir conveyor 604 is connected to an egg loading section 606 of the egg handling machine 602 at first end 608 and an egg grading machine (not shown) at second end 610. In an example operation, eggs are passed from the egg grading machine (not shown) to the reservoir conveyor 604 via the second end 610. The reservoir conveyor 604 then passes the eggs along the conveyor to the first end 608 and then to the egg loading section 606. The egg loading section 606 then receives an egg package (not shown) along a conveyor 612 and then deposits a plurality of eggs into the egg package. The eggs are deposited in the egg package such that the egg package is open and at least a portion of each of the eggs is accessible. In most instances, at least a portion of the eggs extend above the open egg package. Typically the eggs do not travel continuously down the conveyor belt of conveyor 612. Instead as each set of eggs are placed in the egg package at the egg loading section 606, a pause in the conveyor belt of the conveyor 612 occurs. During this pause or dwell time, the at least one laser source in the laser printing assembly 614 prints data on at least one of the eggs in the open egg carton. Preferably, the at least one laser source prints data on each of the eggs in the open egg carton.

The laser printing assembly may be configured on various configurations depending on the markings to be applied onto the eggs and the egg processing speed required in different embodiments or environments. For example, in one embodiment, the laser printing assembly 614 may be situated at the side of the conveyor 612 at a position where a portion of the egg carton is located below the at least one laser source. In another embodiment, the at least one laser source or associated beam delivery or beam deflecting or beam focusing elements may be mounted on a linear slide in the laser printing assembly 614 that moves parallel to the row of eggs during the dwell time and perpendicular to the direction of the conveyor belt of the conveyor 612. Thus, the at least one laser source prints from above the eggs contained in the egg package. The information printed thereon includes text and graphics, and can include an advertisement, freshness information, traceability data, or other types of relevant information, or any combination thereof. In those embodiments in which the laser source prints from above the eggs, egg debris and/or broken eggs will not fall onto the laser source and therefore, will not cause downtime or impede print quality.

Figure 8:
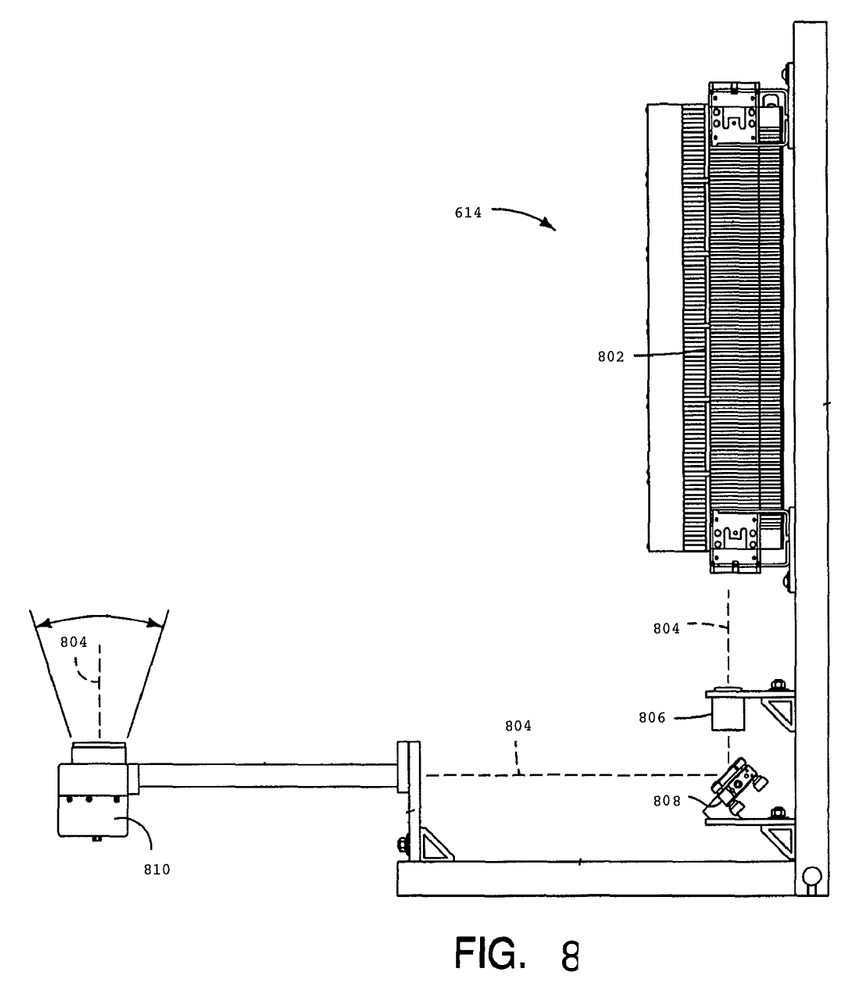
FIG. 8 is a diagrammatic view depicting a laser printing assembly for performing an embodiment of the method of the present disclosure.

FIG. 8 is a diagram of one embodiment of the laser printing assembly 614 of FIGS. 6 and 7. The laser printing assembly 614 includes at least one laser source 802. The laser source 802 outputs a laser beam 804 that passes through a collimating and focusing lens 806, is then reflected off of mirror 808 to a galvanometer scanning head 810 that directs the laser beam to a specific location on the eggs passing thereunder. The laser printing assembly 614 may also include other components as necessary to interact with the apparatus 600 and apply the desired laser markings to the eggs. The laser printing assembly, which includes at least one laser source, preferably has vector scan and raster scan capability for applying the desired markings to the eggs. The laser printing assembly is in communication with an associated computer, controller, central processing unit, or the like ("computer system") that controls the operation of the laser printing assembly and the at least one laser source contained therein.

Figure 9:
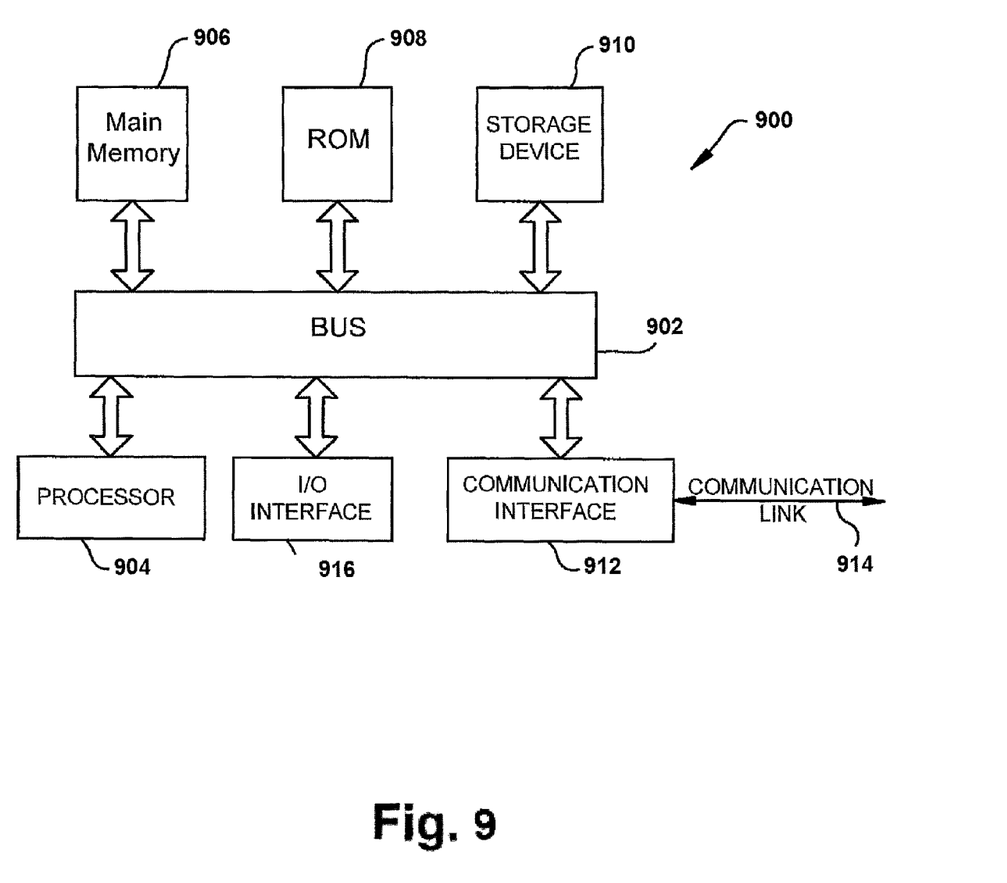
FIG. 9 illustrates an example of a computer system 900 upon which an example embodiment may be implemented.

FIG. 9 illustrates an example of a computer system 900 upon which an example embodiment may be implemented. Computer system 900 is suitable for implementing the functionality of any embodiment of the apparatus 600 described herein in FIGS. 6 and 7.

Computer system 900 includes a bus 902 or other communication mechanism for communicating information and a processor 904 coupled with bus 902 for processing information. Computer system 900 also includes a main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, optical disk, SD memory and/or flash storage, is provided and coupled to bus 902 for storing information and instructions.

An aspect of the example embodiment is related to the use of computer system 900 to implement the method and system for applying laser markings to food products. According to an example embodiment, applying laser markings thereon are provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 904 for execution. Such a medium may take many forms, including but not limited to non-volatile media, and volatile media. Non-volatile media include, for example, optical or magnetic disks, such as storage device 910. Volatile media include dynamic memory, such as main memory 906. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read. Various forms of computer-readable media may be involved in carrying one or more sequences of one or more instructions to processor 904 for execution. The instructions may optionally be stored on storage device 910 either before or after execution by processor 904.

The computer system 900 also includes a communication interface 912 coupled to bus 902, for providing a two-way data communication coupling computer system 900 to communication link 914. Communication link 914 typically provides data communication to other networks or devices. Although the illustrated example has one communication interface 912 and one communication link 914, those skilled in the art should readily appreciate that this is for ease of illustration, as the example embodiments described herein may have any physically realizable number of communication interfaces 912, and/or communication links 914. The computer system 900 may further include at least one input/output interface 916 connected to the bus 902 and in data communication with one or more user interface devices, such as a mouse, keyboard, monitor/screen, etc. (not explicitly shown).

Notably, while the illustrative embodiment described below shows a single computer system as performing the functions described herein, it is understood that the computer system 900 may comprise, either as a single computer system or as a collection of computer systems, one or more memories, one or more processors, and one or more network interfaces (e.g., adapted to communicate traffic for a collaborative computing session and also traffic on a communication channel other than the collaborative computing session), etc., as may be appreciated by those skilled in the art.

The computer system 900 is operable to control the operation of the laser printing assembly and the at least one laser source contained therein. The computer system 900 is also operable to receive and/or generate data files containing vector and/or rector information for producing or generating movement of the laser beam to produce the desired markings. The computer system 900 is operable to control various parameters of the laser beam, such as power, spot size, spot area, laser speed, pulse width, pulse frequency, and/or modulation frequency. This enables optimization of laser performance which enhances resolution of the applied markings. The magnitude and character of these parameters may be associated with the vector and raster information and stored in memory and programmably varied according to the desired results.

The computer system 900 is preferably interconnected with other computer systems, sensors devices, and other devices associated with other machines, systems, networks, and the like that interact with the apparatus 600 as set forth in FIGS. 6 and 7. For example, the computer system 900 is preferably interconnected with the computer system that controls and monitors the operation of the egg-handling machine 602. The computer system preferably receives environmental and product information from the egg-handling machine, such as wash water temperature, rinse water temperature, wash water pH values, egg origin and characteristic information, and the like. The computer system also preferably receives information from position sensors which monitor the operating status of all important moving components of the apparatus 600.

In one embodiment, the environmental information, product information, positional information, and other relevant processing information may be obtained using image capturing devices, machine-readable or human-readable sensors and identifiers, radio frequency identification transponders (RFID) or other transmitting sensors, time stamps or biometric identification, object recognition, texture definition, database management, and other software, data interface equipment consisting of serial, parallel, or network communication, binary data such as switches, gates, push buttons, current sensors, as well as additional forms of data input. The computer system 900 processes the obtained data and uses such data in the control and operation of the laser printing assembly as well as the associated egg-handling machine. By adjusting the depth or other characteristics of the laser marking applied thereon, a more consistent mark is achieved and variations of marking quality between different types of eggs, environments, and the like may be reduced and/or eliminated.

Egg origin and characteristics of the eggs on which the laser marking is to be applied, or the environmental or processing conditions to which the eggs are subject, may affect the quality of the mark to be applied thereon. These factors include, but are not limited to:

Shell composition (chemical);
Shell composition (mechanical features);
Shell thickness;
Percentage of cuticle remaining;
Shell strength;
Species of bird (chicken, ducks, turkeys, etc.);
Feed for bird;
Breed
Water source for bird;
Barn temperature;
Molt cycle;
Age of bird;
Age of the egg
Color of egg;
Egg weight (individual and package);
Egg grade;
Egg surface temperature at time of lasing;
Egg wetness at time of lasing;
Egg internal temperature at time of lasing;
Thermal conductive coefficient of egg shell;
Curvature of egg relative to the marking;
Egg washing process parameters;
Egg rinsing parameters;
Egg drying parameters;
Temperature and humidity in the packing facility;
Time of day;
Egg packaging parameters;
Peak temperature reached;
Degree of focus of the laser during marking;
Movement of egg during marking;
Temperature of air local to marking point; and
Effectiveness of vacuum system.

Data relating to the characteristics associated with eggs or the processing or environmental conditions may be obtained by any suitable means. For example, the egg origin and characteristic information of the eggs may be obtained from the source providing the eggs, inspection/examination prior to the processing, data obtained from previous processing of similar types of eggs, data received or obtained by the computer system 900 during monitoring of the marking process, or any other means. Data relating to the environmental conditions, processing parameters, and the interaction of the laser with the egg shell may be obtained from previous processing of similar types of eggs, data received or obtained by the computer system 900 during monitoring of the marking process, or any other means. The computer system preferably stores the data in memory and uses such data as necessary in the control and operation of the laser printing assembly as well as in the control and operation of the egg-handling machine.

In accordance with an embodiment of the present disclosure, the performance or characteristics of the laser may be adjusted in response to selected characteristics of the food product in order to optimize the marking applied thereon. Further, the interaction of the laser with the food product may be monitored by any suitable means and the depth or other characteristics of the laser marking may be adjusted in response to such parameters. By adjusting the depth or other characteristics of the laser marking applied thereon, a more consistent mark is achieved and variations of marking quality between different types of eggs, environments, and the like may be reduced and/or eliminated.

The laser performance parameters may be suitably set or adjusted based on the egg characteristics, environmental conditions, processing conditions, interaction with the laser and the egg shell, and combinations thereof. In a preferred embodiment, the computer system 900 controls various parameters of the laser printing assembly and the at least one laser source to optimize the laser markings to be applied to the eggs. The parameters that may be set or adjusted include, but are not limited to:

Laser power;
Spot size;
Depth of field;
Speed of traverse of the laser beam over the surface of the object being marked;
Number of passes;
Dwell-time between passes;
Power settings within/between passes;
Spot size of laser beam within/between passes;
Speed of traverse within/between passes;
Order of passes;
Dwell-time in corners of characters;
Configuration of character fonts;
Configuration of any graphical objects to be marked;
Localized heat buildup;
Laser pulse frequency; and
Laser wavelength.

The laser performance parameters may be set or adjusted prior to the laser marking process, during the laser marking process in response to data obtained during processing, or any combination thereof. The laser performance parameters may be set or adjusted per egg, per batch, per run, or any combination thereof. Preferably, the laser performance parameters are adjusted to optimize the laser marking applied thereon such that a more consistent marks is achieved and variations in marking quality are reduced and/or eliminated. In a preferred embodiment, the depth of the laser marking on the egg is adjusted to optimize the marking applied thereon as well as maintain the structural integrity of the egg shell.

In one embodiment, at least a portion of the eggs are examined or analyzed during and/or after the laser marking process to determine the position and/or characteristics of the eggs that are to be marked and/or the quality and integrity of the information that is marked on the eggs. Any number of environmental and processing conditions may be analyzed to produce a specific optimized or improved marking on the eggs in response to the analyzed conditions. For example, the laser performance parameters may be adjusted by maximizing or increasing the change in color caused by the directed energy from the laser, reducing the localized depth of mark caused by the directed energy on the egg shell, increasing the speed at which such change in color can occur, or improving the consistency of any other parameter that may be determined between one egg and another.

In some embodiments, at least a portion of the eggs are analyzed to determine the depth of the laser marking applied thereon by any suitable means. In one embodiment, a two dimensional profilometer is contacted with the egg shell to verify and/or determine the depth of the laser marking. In another embodiment, non-contact telemetry measurements may be used to measure the egg's surface and the depth of the marking. In both of these methods, the surface profile of marked areas of the egg is compared with unmarked areas of the egg in the vicinity of the marked areas. This comparison allows the amount of egg surface material that has been ablated, to be determined via analytical and statistical processes. Examples of such telemetry methods include, but are not limited to, laser-based methods (visible and/or invisible lasers), structured light, interferometer, stereo-camera based, galvo-based laser scanning, 2-axis translation scanning, and the like. Preferably, the depth measurements are performed close to the laser source. The laser performance parameters are suitably adjusted in response to such depth measurements to optimize the marking applied thereon as well as maintain the structural integrity of the egg shell.

In another embodiment, at least a portion of the eggs have quality markings applied thereto by any suitable means. The eggs having such quality marks are examined or analyzed during and/or after the laser marking process to assess the quality and integrity of such quality mark. The eggs having such quality marks may be processed under similar conditions to other eggs to assess the environmental and processing conditions to which the eggs are subjected. In another embodiment, the eggs having such quality marks are processed under differing environmental and processing conditions to determine the optimal conditions for processing such eggs. Data associated with the quality marked eggs is obtained by any suitable means and may be stored in memory. The obtained data is then analyzed via any suitable means, such as statistical analysis, to determine any variations in the parameters which resulted in changes in the quality marks and to determine the desired parameters for optimal marking of the eggs. Preferably, the laser performance parameters are adjusted in response to such analysis for optimized printing.

In some embodiments, a machine vision system 616 may be configured and arranged so as to the examine the position and characteristics of eggs that are to be marked and/or the quality and integrity of the information that is marked on the eggs. In some embodiments, one or more machine vision observation units or imaging sensors 618 may be positioned, for example, adjacent the laser printing assembly 614. In other embodiments, the one or more imaging sensors 618 may be located elsewhere to allow for adequate observation. In a preferred embodiment, the machine vision system 616 is operable to control the operation of the one or more imaging sensors 618 and to receive image data obtained from the one or more imaging sensors 618. The machine vision system 616 is also operable to receive and transmit data to the computer system 900.

As used herein, the phrase "imaging sensor" refers to a component of a vision system that captures image data, e.g., a camera or other image capturing device. In machine vision systems, one or more imaging sensors are configured and arranged to capture image data of one or more areas of interest within a facility. Imaging sensors include analog video cameras, digital video cameras, color and monochrome cameras, closed-circuit television cameras, charge-coupled device sensors, complementary metal oxide semiconductor sensors, analog and digital cameras, PC cameras, pan-tilt-zoom cameras, web cameras, infra-red imaging devices, and any other devices that can capture image data. The selection of the particular camera type and selection of the connected machine vision system for a particular facility may be based on factors including environmental lighting conditions, the frame rate and data acquisition rate, and the ability to process data from the lens of the camera within the electronic circuitry of the camera control board, the size of the camera and associated electronics, the ease with which the camera can be mounted as well as powered, the lens attributes which are required based on the physical layout of the facility and the relative position of the camera to the area of interest, and the cost of the camera.

In one embodiment, the system as disclosed herein may be stopped if the machine vision system 616 determines that the mark quality has fallen below a certain threshold. In some embodiments, such a system may be a closed-loop such that feedback from the machine vision system 616 may be used to control the laser printing assembly 614 so as to improve the quality and reliability of the process. For example, feedback from the machine vision system 616 might result in adjustment in the number of passes made, the scan rate, the power level of the laser, etc., in order to ensure a desired contrast level is achieved during the laser marking process. Additionally, or alternatively, the machine vision system 616 may examine the size, color, or other perceptible properties of the eggs to be marked and make appropriate adjustments to the laser performance parameters and/or process to account for such variables and thereby ensure that image quality stays consistent in spite of such variations.

Data obtained prior to, during, and/or after processing of the eggs is suitably stored in memory for later use. The obtained data may be stored in memory local to the egg processing facility and/or remotely by any suitable means. The obtained data may be accessed and analyzed via any suitable means, such as statistical analysis, to determine any variations, trends, patterns, and the like.

It is understood that it may be undesirable to analyze each egg for cost and processing time reasons. Therefore, in some embodiments, a portion of the eggs processed are routed to a quality analysis station for analysis and examination. The eggs may be routed to such quality analysis station prior to, during, and/or after processing thereof. The eggs are subjected to the analysis and examination as discussed above.

Figure 10:
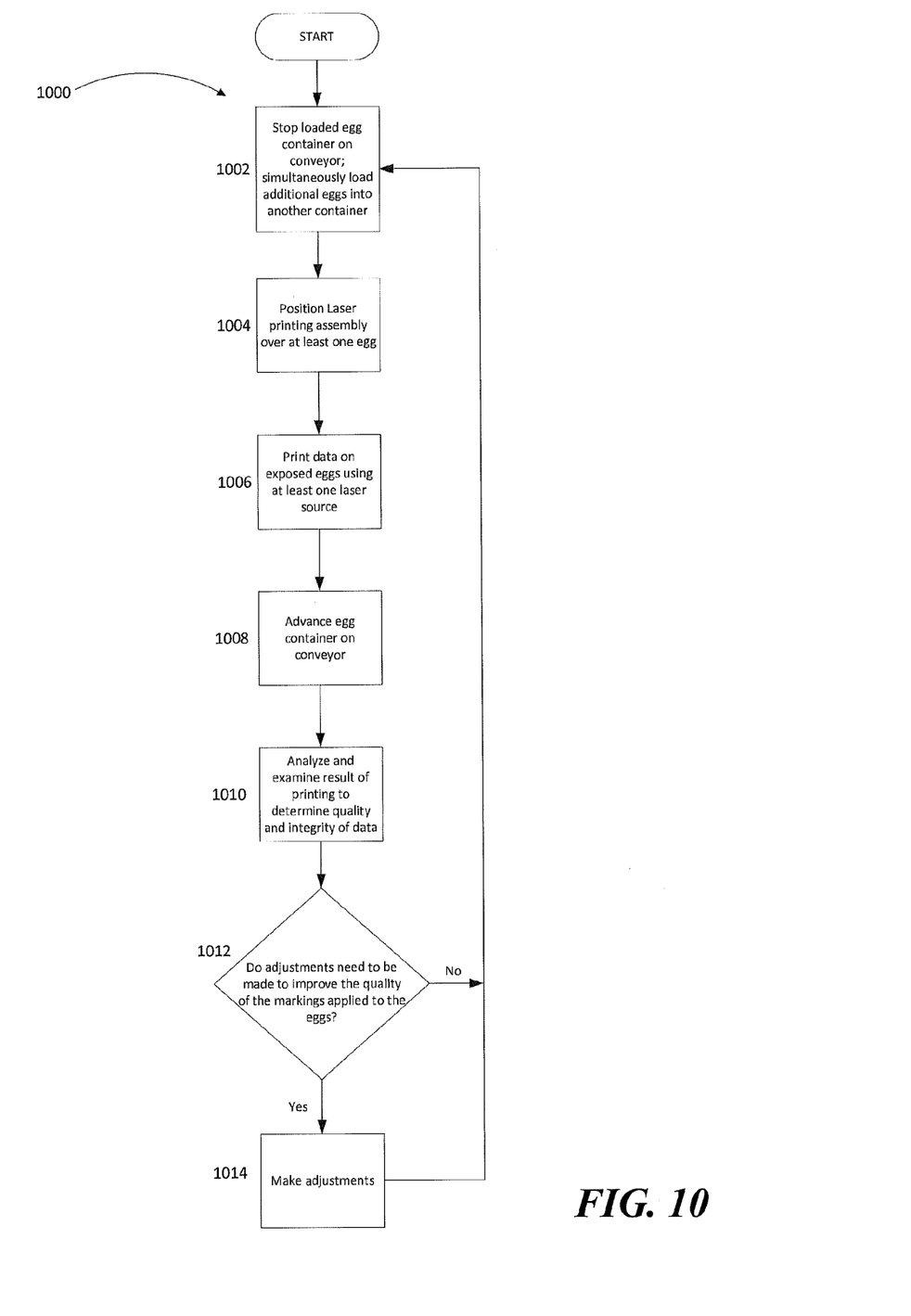
FIG. 10 is an example flow diagram of laser marking on eggs with the apparatus as shown in FIGS. 6 and 7 in accordance with an example implementation.

FIG. 10 is an example flow diagram 1000 of laser marking on eggs with the apparatus 600 as shown in FIGS. 6 and 7 in accordance with an example implementation. An egg carton stops for a predetermined period of time under the egg loading section 606 which loads the eggs into an egg container. Simultaneously while an egg container is being loaded by the egg loading section 606, a loaded egg container is stopped on the conveyor 612 under the laser printing assembly 614 as shown at 1002. The at least one laser source contained within the laser printing assembly 614 is positioned over at least one egg in the egg container as shown at 1004. The at least one laser source prints data onto the exposed eggs in accordance with the desired laser performance parameters as shown at 1006. The egg container is then advanced on the conveyor 612 as additional eggs are placed in an egg container by the egg loading section 606 as shown at 1008. At 1010, the eggs having data printed thereon are analyzed and examined as discussed above to determine the quality and integrity of the data printed thereon as well as the structural integrity of the eggs. In response to such analysis and examination, the computer system 900, or other suitable means, determines if any of the laser performance parameters, environmental conditions, and/or processing conditions need to be adjusted to improve the quality of the markings applied to the eggs as shown at 1012. If it is determined that certain parameters and/or conditions need to be adjusted, such adjustments are made by any suitable means as shown at 1014. The next container of eggs is then processed according to such parameters and laser marking process continues again as shown at 1002. If it is determined that the parameters do not need to be adjusted, the laser marking continues again as shown at 1002.

As an example illustrative of the method and system of the present disclosures, Change in feed for the chickens can result in changes in egg surface properties, resulting in a change in mark quality or depth of mark. Therefore adjustments would be needed to the lasers to bring the mark quality and depth of mark back into optimum results.

Another example is a degradation in laser power from the laser source, debris or other fouling of the optical components, and adjustment in the relative position between where the eggs pass for marking and the laser source or optical component. All of these could result in changes in mark quality or depth of mark, and changes in laser parameters may be advantageous to restore optimum performance.

The control of the laser performance parameters, in response to the environmental conditions, and the processing conditions by the computer system 900 results in optimized printing on the eggs such that a more consistent mark is achieved and variations in marking quality are reduced and/or eliminated. As the speed of the printing is so controlled, there are fewer restrictions on the amount of data printed and the quality of the print is improved. The control of laser performance parameters, the environmental conditions, and process conditions results in clearer print, increased in change in color on the eggs, reduced chipping of the egg shells, and increased printing speed. In addition, as in some embodiments, the laser printing is performed from above the eggs, the data printed on the eggs is on the consumer facing surface of the egg shell and readable by the consumer. This results in a reduction of the need for physical handling of the eggs in the carton by the consumer, which reduces contamination and breakage. Further, as the eggs are suitably printed once already placed into their branded egg container, the need to match the eggs to their container is obviated, reducing consumer and retailer dissatisfaction.

Having thus described certain embodiments of systems and methods for practicing aspects of the present disclosure, it is to be appreciated that various alterations, modifications, and improvements will readily occur to those skilled in the art. Such alterations, modifications, and improvements are intended to be part of this disclosure, and are intended to be within the spirit and scope of this disclosure.

The invention claimed is:

1. A system for laser marking individual objects with indicia at a marking station while the objects travel along at least one path through a processing system, the system comprising:
   at least one processor operable to control laser marking of individual objects;
   at least one laser marking unit operatively coupled to the at least one processor and controlled in part by the at one least processor, the at least one laser marking unit positioned adjacent at least one path along which the objects are conveyed, the at least one laser marking unit operable to direct at least one laser beam onto the objects to mark the objects with indicia as the objects pass through the marking station, wherein the objects are disposed in a package adapted for distribution thereof prior to passing through the marking station; and
   a non-transient memory operatively coupled to the at least one processor and operable to store data associated with the laser marking of the objects;
   wherein the least one processor is operable to:
      obtain status data associated with at least one of at least one operational parameter of the processing system, at least one operational parameter of the at least one laser marking unit, at least one characteristic of the individual objects to be marked, at least one characteristic of the indicia to be marked thereon, and combinations thereof;
      determine in response to at least a portion of the status data, at least one operational parameter of the at least one laser marking unit;
      configure the at least one operational parameter of the least one laser marking unit in accordance with such determination; and
      direct at least one laser beam from at the least one laser marking unit onto the objects in accordance with the at least one operational parameter to form indicia thereon.

2. The system of claim 1, wherein the status data is obtained during at least one of prior to the marking of indicia on the objects, during the marking of indicia on the objects, after the marking of indicia on the objects, and any combination thereof.

3. The system of claim 1, wherein the at least one operational parameters of the at least one laser marking unit to be determined includes laser power, spot size, depth of field, laser pulse frequency, laser wavelength, speed of traverse of the laser beam over the surface of the object to be marked, dwell time, number of passes, characteristics associated with each passes and time between passes, and combinations thereof.

4. The system of claim 1 wherein the at least one processor is further operable to store at least a portion of the status data in the non-transient memory.

5. The system of claim 1, wherein the objects are individual eggs.

6. The system of claim 5, wherein the indicia to be marked on the eggs comprises at least one text, graphics, and any combination thereof, and includes at least one of advertisement, sponsored images, freshness information, traceability data, source information, and any combination thereof.

7. The system of claim 5, wherein the status data includes at least one operational parameter of an associated egg-handling apparatus to which the eggs are subjected prior to or after the marking thereon by the at least one laser marking unit.

8. The system of claim 5, wherein the at least one processor is further operable to obtain status data as to the quality of markings applied to the individual eggs; adjust, in response to the obtained status data, at least one of the operational parameters of the processing system, at least one of the operational parameters of the at least one laser marking unit, and combinations thereof; and direct at least one laser beam from the at least one laser marking unit onto the eggs to be marked thereafter in accordance with the at least one adjusted operational parameter to form indicia thereon.

9. The system of claim 5, wherein the at least one processor is operable to obtain status data as to approximate depth the indicia is marked on the eggs.

10. A method for laser marking individual objects with indicia at a marking station while the objects travel along at least one path through a processing system, wherein at least one laser marking unit is positioned adjacent at least one path along which the objects are conveyed, the at least one laser marking unit operable to direct at least one laser beam onto the objects to mark the objects with indicia as the objects pass through the marking station, wherein the objects are disposed in a package adapted for distribution thereof prior to passing through the marking station, the method comprising:

obtaining status data associated with at least one of at least one operational parameter of the processing system, at least one operational parameter of the at least one laser marking unit, at least one characteristic of the individual objects to be marked, at least one characteristic of the indicia to be marked thereon, and combinations thereof;

determining, in response to at least a portion of the status data, at least one operational parameter of the at least one laser marking unit;

configuring the at least one operational parameter of the least one laser marking unit in accordance with such determination; and directing at least one laser beam from at the least one laser marking unit onto the objects in accordance with the at least one operational parameter to form indicia thereon.

11. The method of claim 10, wherein the status data is obtained during at least one of prior to the marking of indicia on the objects, during the marking of indicia on the objects, after the marking of indicia on the objects, and any combination thereof.

12. The method of claim 10, wherein the at least one operational parameters of the at least one laser marking unit to be determined includes laser power, spot size, depth of field, laser pulse frequency, laser wavelength, speed of traverse of the laser beam over the surface of the object to be marked, dwell time, number of passes, characteristics associated with each passes and time between passes, and combinations thereof.

13. The method of claim 12, wherein the method further comprises storing at least a portion of the status data in an associated non-transient memory.

14. The method of claim 10, wherein the objects are individual eggs.

15. The method of claim 14, wherein the indicia to be marked on the eggs comprises at least one text, graphics, and any combination thereof, and includes at least one of advertisement, sponsored images, freshness information, traceability data, source information, and any combination thereof.

16. The method of claim 14, wherein the status data includes at least one operational parameter of an associated egg-handling apparatus to which the eggs are subjected prior to or after the marking thereon by the at least one laser marking unit.

17. The method of claim 14, wherein the method further comprises obtaining status data as to the quality of markings applied to the individual eggs; adjusting, in response to the obtained status data, at least one of the operational parameters of the processing system, at least one of the operational parameters of the at least one laser marking unit, and combinations thereof; and directing at least one laser beam from at the least one laser marking unit onto the eggs to be marked thereafter in accordance with the at least one adjusted operational parameter to form indicia thereon.

18. The method of claim 14, wherein the method further comprises obtaining status data as to approximate depth the indicia is marked on the eggs.

19. An apparatus for laser marking individual objects with indicia at a marking station, the apparatus comprising:

at least one processor operable to control laser marking of individual objects;

at least one laser marking unit operatively coupled to the at least one processor and controlled in part by the at least processor, the at least one laser marking unit positioned adjacent at least one path along which the objects are conveyed, the at least one laser marking unit operable to direct at least one laser beam onto the objects to mark the objects with indicia as the objects pass through the marking station, wherein the objects are disposed in a package adapted for distribution thereof prior to passing through the marking station; and a non-transient memory operatively coupled to the at least one processor and operable to store data associated with the laser marking of the objects;

wherein the least one processor is operable to:
obtain status data associated with at least one of at least one operational parameter of the at least one laser marking unit, at least one characteristic of the individual objects to be marked, at least one characteristic of the indicia to be marked thereon, at least one operational parameter of an associated processing system, and combinations thereof;

determine in response to at least a portion of the status data, at least one operational parameter of the at least one laser marking unit;

configure the at least one operational parameter of the least one laser marking unit in accordance with such determination; and direct at least one laser beam from at the least one laser marking unit onto the objects in accordance with the at least one operational parameter to form indicia thereon.

20. The apparatus of claim 19, wherein the objects are individual eggs, and wherein the indicia to be marked on the eggs comprises at least one text, graphics, and any combination thereof, and includes at least one of advertisement, sponsored images, freshness information, traceability data, source information, and any combination thereof.

* * * * *